(12) United States Patent
Sugawara et al.

(10) Patent No.: US 11,294,114 B2
(45) Date of Patent: Apr. 5, 2022

(54) OPTICAL ELEMENT AND PROJECTION IMAGE DISPLAY APPARATUS

(71) Applicant: DEXERIALS CORPORATION, Tokyo (JP)

(72) Inventors: Junichi Sugawara, Miyagi (JP); Yoshi Kanega, Miyagi (JP); Toshiaki Sugawara, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/766,174

(22) PCT Filed: Nov. 13, 2018

(86) PCT No.: PCT/JP2018/041957
§ 371 (c)(1),
(2) Date: May 21, 2020

(87) PCT Pub. No.: WO2019/102902
PCT Pub. Date: May 31, 2019

(65) Prior Publication Data
US 2020/0284964 A1    Sep. 10, 2020

(30) Foreign Application Priority Data

Nov. 21, 2017    (JP) .............................. JP2017-223769

(51) Int. Cl.
*G02B 5/30* (2006.01)
*G02F 1/13363* (2006.01)
(Continued)

(52) U.S. Cl.
CPC ............ *G02B 5/3083* (2013.01); *G02B 1/115* (2013.01); *G02B 1/14* (2015.01); *G02F 1/13363* (2013.01); *G03B 21/006* (2013.01)

(58) Field of Classification Search
CPC ..... G02B 5/3083; G02B 1/14; G02F 1/13363; G02F 1/133638
See application file for complete search history.

(56) References Cited

U.S. PATENT DOCUMENTS

| | | | |
|---|---|---|---|
| 2012/0293732 A1* | 11/2012 | Koike | G02B 1/115 349/5 |
| 2015/0316782 A1* | 11/2015 | Maeda | G02B 27/141 353/20 |
| 2019/0235295 A1* | 8/2019 | Sugawara | G02F 1/13363 |

FOREIGN PATENT DOCUMENTS

| | | |
|---|---|---|
| JP | 2003-270636 A | 9/2003 |
| JP | 2008-152007 A | 7/2008 |

(Continued)

OTHER PUBLICATIONS

Tokas et al., "Spectroscopic Ellipsometry Investigations of Optical Anisotropy in Obliquely Deposited Hafnia Thin Films," AIP Conference Proceedings, May 2016, vol. 1731, No. 1, p. 060007-1-060007-3.

(Continued)

*Primary Examiner* — Ryan D Howard
(74) *Attorney, Agent, or Firm* — Oliff PLC

(57) ABSTRACT

An optical element and a projection image display apparatus capable of obtaining excellent tolerance to light of high luminance and high output. The optical element includes a substrate transparent to light in a used wavelength band, and a birefringent layer including an obliquely deposited film containing hafnium oxide as a main component. The projection image display apparatus includes a liquid crystal display device having the optical element, a light source for emitting light, and a projection optical system for projecting modulated light, and the liquid crystal display device is disposed in an optical path between the light source and the projection optical system.

2 Claims, 6 Drawing Sheets

(51) Int. Cl.
G02B 1/14 (2015.01)
G02B 1/115 (2015.01)
G03B 21/00 (2006.01)

(56) References Cited

FOREIGN PATENT DOCUMENTS

| JP | 2008-216644 A | 9/2008 |
|---|---|---|
| JP | 2008-268466 A | 11/2008 |
| JP | 2012-242449 A | 12/2012 |
| JP | 2012-256024 A | 12/2012 |
| JP | 2013-228574 A | 11/2013 |
| JP | 2014-122984 A | 7/2014 |
| JP | 2015-082010 A | 4/2015 |

OTHER PUBLICATIONS

Tokas et al., "Effect of angle of deposition on micro-roughness parameters and optical properties of HfO2 thin films deposited by reactive electron beam evaporation," Thin Solid Films, 2016, vol. 609, pp. 42-48.
Feb. 19, 2019 International Search Report issued in International Patent Application No. PCT/JP2018/041957.
Aug. 31, 2021 Office Action issued in Japanese Patent Application No. 2018-177908.
Tokas, R.B. et al. "Spectroscopic ellipsometry investigations of optical anisotropy in obliquely deposited hafnia thin films," American Institute of Physics, vol. 1731, No. 1, p. 060007-1-16007-3, 2016.
Jun. 22, 2021 Office Action issued in Chinese Patent Application No. 201880071695.9.
Jan. 4, 2022 Decision of Rejection issued in Chinese Patent Application No. 201880071695.9.

\* cited by examiner

OPTICAL ELEMENT AND PROJECTION IMAGE DISPLAY APPARATUS

TECHNICAL FIELD

The present technology relates to an optical element having an obliquely deposited film and a projection image display apparatus. This application claims priority on the basis of Japanese Patent Application No. 2017-223769, filed on Nov. 21, 2017 in Japan, which is incorporated herein by reference.

BACKGROUND ART

Conventionally, an optical element in which an obliquely deposited film of a dielectric material is formed on a surface of a transparent substrate has been known. The oblique deposition is a method of forming a film by inclining the substrate surface with respect to the flying direction of the deposition material, and the structure of the deposition film is observed as a columnar structure in which an aggregate of fine columns is inclined with respect to the substrate surface at a constant angle. The density of the column has an in-plane anisotropy and the refractive index has an in-plane anisotropy, resulting in a birefringence phenomenon in the obliquely deposited film. The obliquely deposited film is used for optical elements such as a ¼ wavelength retardation plate and a ½ wavelength plate due to the birefringence phenomenon. For example, PLT 1 discloses a retardation element having an obliquely deposited film mainly composed of tantalum pentoxide ($Ta_2O_5$).

CITATION LIST

Patent Literature

PLT 1: Japanese Unexamined Patent Application Publication No. 2012-256024

SUMMARY OF INVENTION

Technical Problem

In recent years, as a light source used in a projector, a laser light source capable of obtaining high luminance and high output has attracted attention. However, the obliquely deposited film containing tantalum pentoxide as a main component was sometimes damaged by light of high luminance and high output from a laser light source.

In view of the above, it is an object of the present technology to provide an optical element and a projection image display apparatus capable of obtaining excellent tolerance to high luminance and high output light.

Solution to Problem

To solve the problem described above, the optical element according to the present technology is characterized by including a substrate that is transparent to light in a used wavelength band; and a birefringent layer comprising an obliquely deposited film containing hafnium oxide as a main component, wherein the birefringent layer is formed by alternately forming a first obliquely deposited film having a first inclined direction and a second obliquely deposited film having a second inclined direction with respect to the normal of the substrate.

In addition, the projection image display apparatus according to the present technology is characterized by including the optical element described above, the optical modulator, a light source for emitting light, and a projection optical system for projecting a modulated light, in which the optical modulator and the optical element are disposed in an optical path between the light source and the projection optical system.

Moreover, the method for manufacturing an optical element according to the present technique is characterized by including forming a birefringent layer by repeating a step of depositing a deposition material containing hafnium oxide as main component in a first direction inclined with respect to the normal of a deposition target surface to form a first obliquely deposited film, and a step of depositing a deposition material containing hafnium oxide as main component in a second direction inclined with respect to the normal of the deposition target surface to form a second obliquely deposited film.

Advantageous Effects of Invention

According to this technology, since the obliquely deposited film is formed with hafnium oxide as a main component, excellent tolerance to light of high luminance and high output can be achieved.

DESCRIPTION OF EMBODIMENTS

Hereinafter, embodiments of the present technique will be described in detail in the following order with reference to the drawings.
1. Optical element
2. Method for manufacturing optical element
3. Projection image display apparatus
4. Example

1. Optical Element

The optical element according to the present embodiment includes a substrate that is transparent to light in a used wavelength band, and a birefringent layer comprising an obliquely deposited film containing hafnium oxide as a main component. Thus, excellent tolerance to light of high luminance and high output from a laser light source or the like can be achieved. This is considered to be because hafnium oxide having a high melting point prevents thermal decay of the columnar structure of the obliquely deposited film.

The birefringent layer may be formed by alternately forming a first obliquely deposited film having a first inclined direction and a second obliquely deposited film having a second inclined direction with respect to the normal of the substrate. When the birefringent layer is a film in which the first obliquely deposited film and the second obliquely deposited film are alternately formed, the effect of tolerance to high luminance and high output light is remarkable because the filling rate of the columnar structure is high.

The optical element preferably has at least one anti-reflection layer formed by laminating two or more kinds of dielectric films having different refractive indices. This can reduce reflection and increase transmittance.

Examples of the optical element having such a configuration include a retardation element and a phase difference compensation polarization element that provide a phase difference to incident light. Hereinafter, a retardation element will be described as an example of an optical element.

Figure 1:
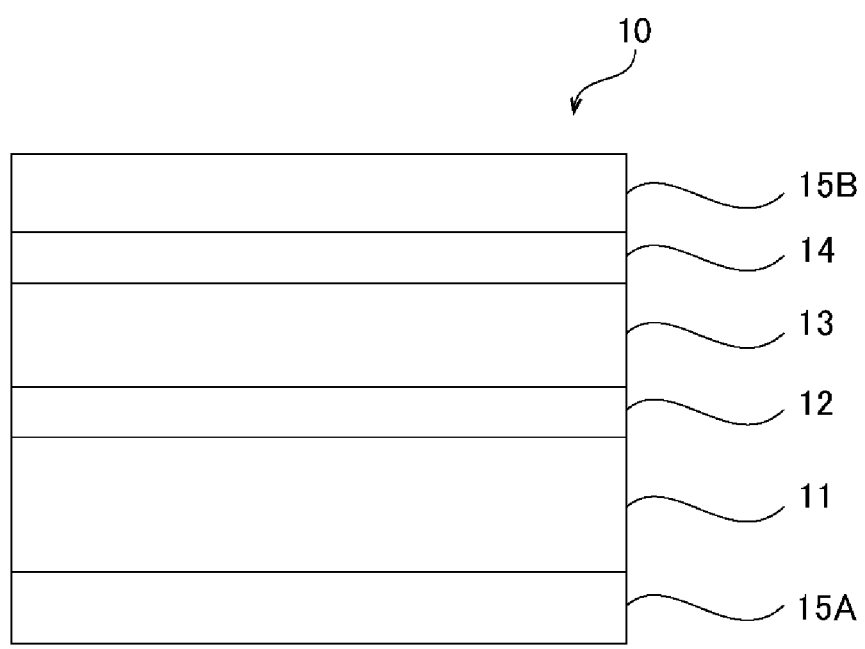
FIG. 1 is a cross-sectional view showing a configuration example of a retardation element.

FIG. 1 is a cross-sectional view showing a configuration example of the retardation element. As shown in FIG. 1, a retardation element 10 is provided with a transparent substrate 11, a matching layer 12 in which high refractive index films and low refractive index films are alternately laminated on the transparent substrate 11 and the thickness of each layer is equal to or less than the used wavelength, a birefringent layer 13 formed on the matching layer 12 and composed of an obliquely deposited film, and a protective layer 14 formed on the birefringent layer 13 and composed of a dielectric film. In addition, a first anti-reflection layer 15A is provided on the transparent substrate 11 side and a second anti-reflection layer 15B is provided on the protective layer 14 side.

The transparent substrate 11 is transparent to light in the used wavelength band and has a high transmittance to light in the used wavelength band. Examples of the material of the transparent substrate 11 include glass, quartz, crystal, and sapphire, among others. The shape of the transparent substrate 11 is generally rectangular, but any shape may be appropriately selected according to the purpose. The thickness of the transparent substrate 11 is preferably, for example, 0.1 to 3.0 mm.

The matching layer 12 is a multilayer film in which a dielectric film is laminated, and is provided as necessary between the transparent substrate 11 and the birefringent layer 13. The matching layer 12 is designed to reverse and cancel the phases of the surface reflected light and the interface reflected light, thereby preventing reflection at the interface between the transparent substrate 11 and the birefringent layer 13.

The matching layer 12 can be composed of two or more kinds of dielectric films selected from $TiO_2$, $SiO_2$, $Ta_2O_5$, $Al_2O_3$, $CeO_2$, $ZrO_2$, $ZrO$, $Nb_2O_5$, and $HfO_2$. The dielectric film in contact with the birefringent layer 13 of the matching layer 12 is preferably $SiO_2$ having excellent adhesion to hafnium oxide. This further improves light tolerance to a laser light source and the like.

The birefringent layer 13 is formed of an obliquely deposited film containing hafnium oxide ($HfO_2$) as a main component. Here, the main component means a component having the largest ratio in the columnar structure of the obliquely deposited film. The birefringent layer 13 may be a single layer film of an obliquely deposited film or a film in which an obliquely deposited film is alternately formed. The thickness of each of the obliquely deposited films is preferably equal to or less than the used wavelength.

Figure 2:
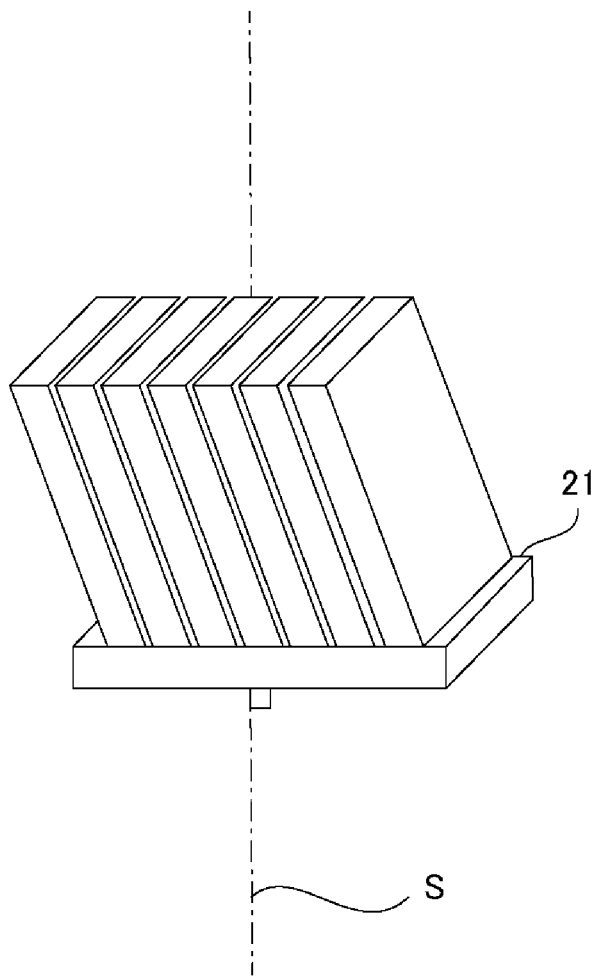
FIG. 2 is a schematic perspective view of an obliquely deposited film.

FIG. 2 is a schematic perspective view of an obliquely deposited film. As shown in FIG. 2, the obliquely deposited film is formed by depositing a deposition material in a direction inclined with respect to the normal S of the deposition target surface 21. The inclination angle of the deposition target surface 21 with respect to the normal S is preferably 60° or more and 80° or less.

The obliquely deposited film is formed of an oblique columnar structure in which a columnar bundle containing hafnium oxide as a main component is constituted obliquely with respect to the normal of the deposition target surface. The oblique columnar structure has columnar portions in which fine particles containing hafnium oxide as a main component are deposited, and void portions which are air layers between the columnar portions.

Figure 3:
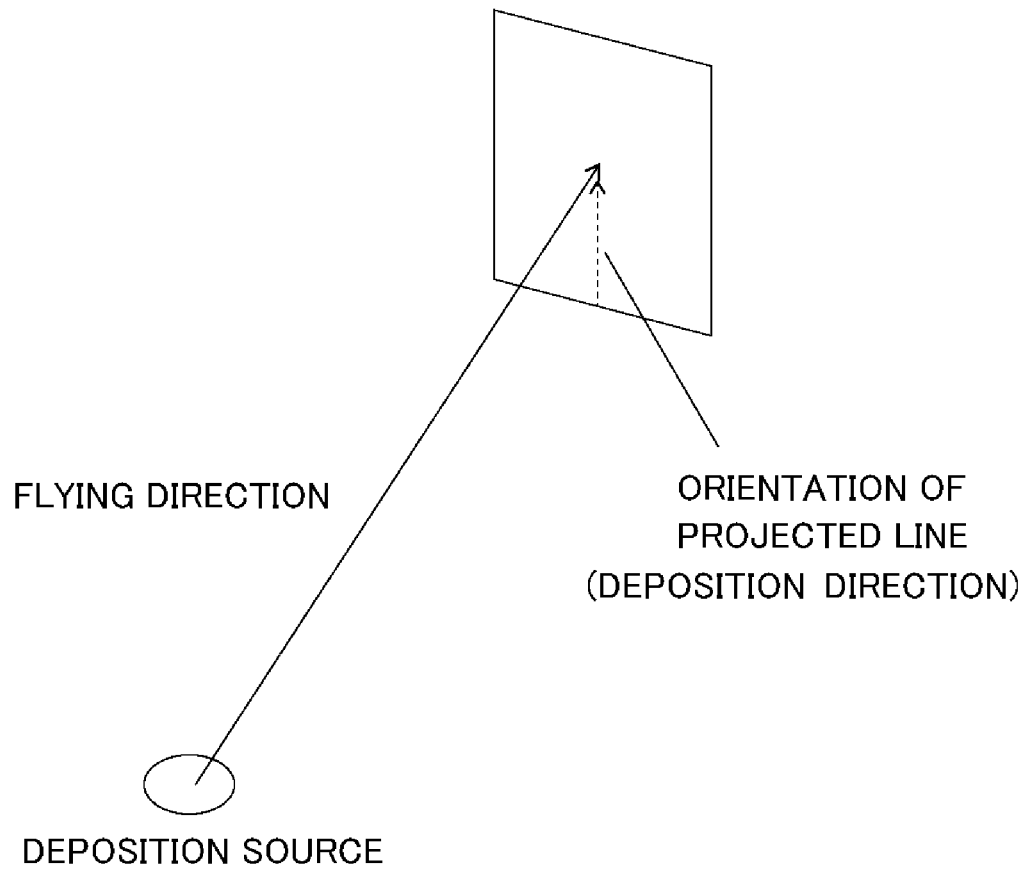
FIG. 3 is a schematic diagram illustrating an oblique deposition method for forming an obliquely deposited film.
Figure 4:
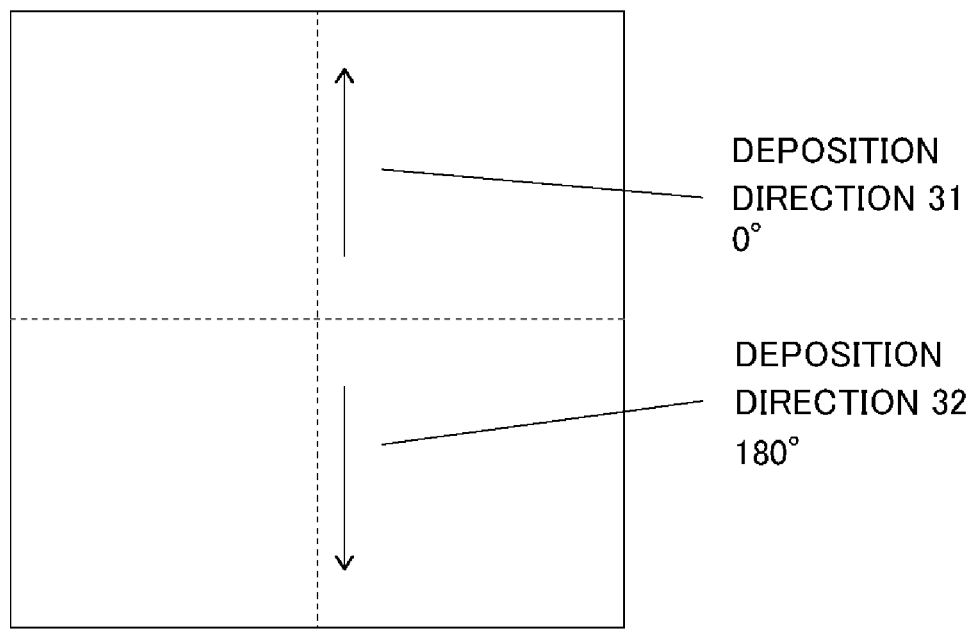
FIG. 4 is a schematic view showing directions in which the deposition directions from a deposition source are projected onto the deposition target surface.

FIG. 3 is a schematic view for explaining an oblique deposition method for forming an obliquely deposited film, and FIG. 4 is a schematic view showing directions in which the flying directions of the deposition material from a deposition source are projected onto a deposition target surface (deposition directions). As shown in FIGS. 3 and 4, a film in which the obliquely deposited films are alternately formed is formed by alternately repeating the deposition from a first deposition direction 31 and the deposition from a second deposition direction 32. Specifically, after the film is formed by deposition from the first deposition direction 31, the deposition target surface is rotated by 180° around the center of the deposition target surface through which the center line perpendicular to the deposition target surface passes, thereby performing deposition from the second deposition direction 32. By repeating this process, a layer is obtained in which the first obliquely deposited film having the first inclined direction and the second obliquely deposited film having the second inclined direction with respect to the normal of the deposition target surface are alternately formed.

The protective layer 14 is made of a dielectric film and is arranged in contact with the obliquely deposited film of the birefringent layer 13. This prevents warp of the retardation element 10 and improves moisture tolerance of the obliquely deposited film.

The dielectric material of the protective layer 14 is not particularly limited as long as it can adjust the stress applied to the retardation element 10 and is effective in improving the moisture tolerance, and can be appropriately selected according to the purpose. Examples of such a dielectric material include $SiO_2$, $Ta_2O_5$, $TiO_2$, $Al_2O_3$, $Nb_2O_5$, LaO, and $MgF_2$, among others, and $SiO_2$ having excellent adhesion to hafnium oxide is particularly preferable. This can further improve moisture tolerance.

The first anti-reflection layer 15A is provided in contact with the surface of the transparent substrate 11 opposite from the birefringent layer 13, and the second anti-reflection layer 15B is provided in contact with the surface of the protective layer 14 opposite from the birefringent layer 13 as required. The first anti-reflection layer 15A and the second anti-reflection layer 15B have an anti-reflection function in a desired wavelength band to be used.

Figure 5:
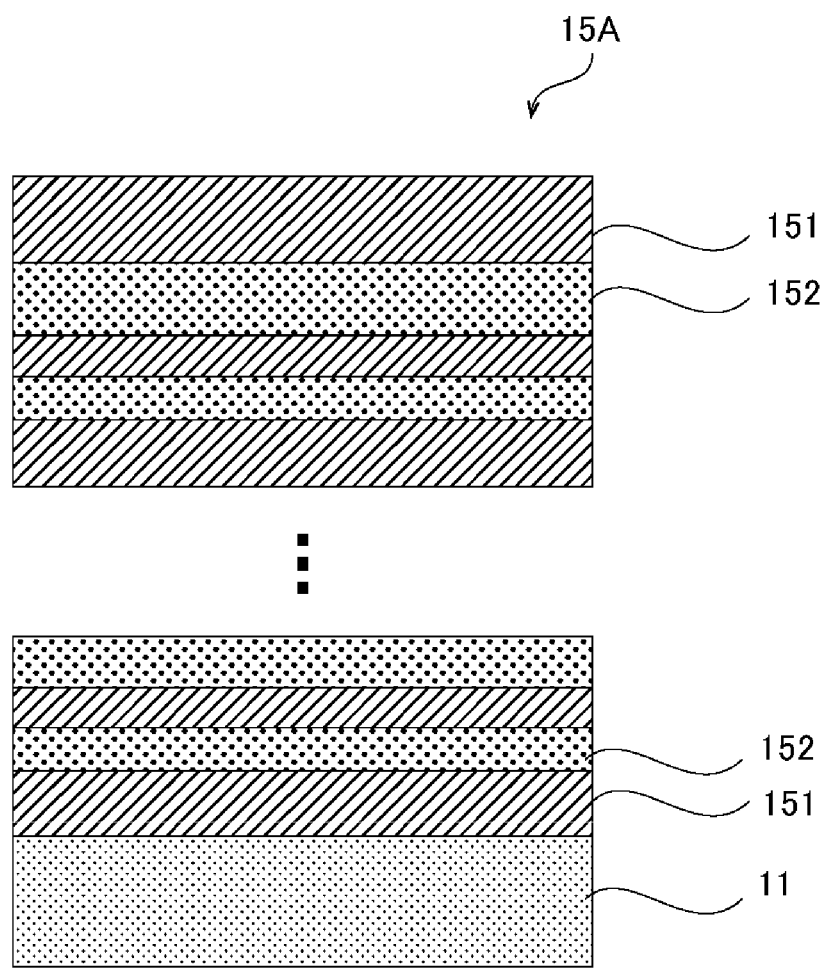
FIG. 5 is a schematic cross-sectional view of an anti-reflection layer.

FIG. 5 is a schematic cross-sectional view of the first anti-reflection layer. As shown in FIG. 5, the first anti-reflection layer 15A is an optical multilayer film in which two or more kinds of dielectric films having different refractive indices are laminated, and is formed of, for example, a multilayer film in which a first dielectric film 151 and a second dielectric film 152 having different refractive indices are alternately laminated.

Although the number of anti-reflection layers can be appropriately determined as necessary, about 5 to 40 layers are preferable from the viewpoint of productivity. It should be noted that the second anti-reflection layer 15B is formed in the same manner as the first anti-reflection layer 15A.

The first anti-reflection layer 15A and the second anti-reflection layer 15B are composed of two or more kinds of dielectric films selected from $TiO_2$, $SiO_2$, $Ta_2O_5$, $Al_2O_3$, $CeO_2$, $ZrO_2$, $ZrO$, $Nb_2O_5$, and $HfO_2$, respectively. For example, the anti-reflection layer may be a multilayer film in which a first dielectric film 151 made of $Nb_2O_5$ having a relatively high refractive index and a second dielectric film 152 made of $SiO_2$ having a relatively low refractive index are alternately laminated.

According to the retardation element having such a configuration, excellent tolerance to light of high luminance and high output from a laser light source or the like can be achieved.

2. Method for Manufacturing Optical Element

Next, a method for manufacturing an optical element according to the present embodiment will be described. A method for manufacturing an optical element according to the present embodiment includes depositing a deposition material containing hafnium oxide as a main component in a direction inclined with respect to the normal of a deposition target surface to form a birefringent layer consisting of an obliquely deposited film containing hafnium oxide as a main component. Moreover, the method for manufacturing an optical element according to the present embodiment includes repeating a step of depositing a deposition material containing hafnium oxide as a main component in a first direction inclined with respect to the normal of a deposition target surface to form a first obliquely deposited film, and a step of depositing a deposition material containing hafnium oxide as a main component in a second direction inclined with respect to the normal of the deposition target surface to form a second obliquely deposited film, thereby forming a birefringent layer in which obliquely deposited films are alternately formed. Thus, an optical element having excellent tolerance to light of high luminance and high output from a laser light source or the like can be achieved.

Figure 6:
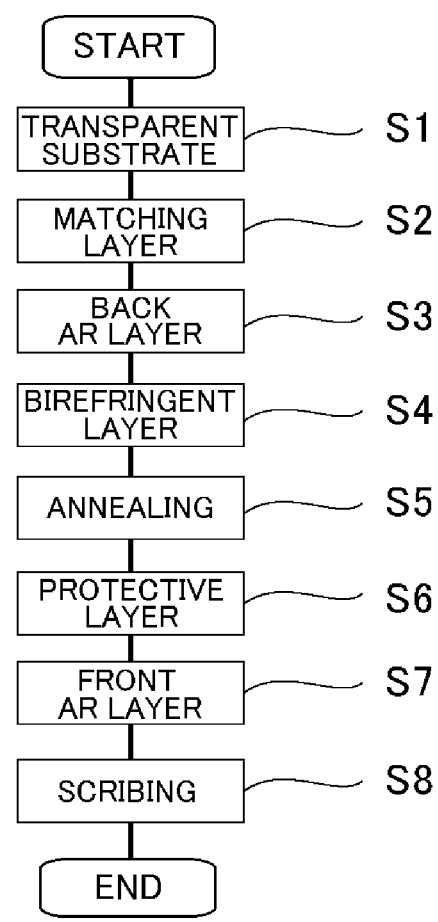
FIG. 6 is a flowchart showing a method for manufacturing a retardation element.

Hereinafter, a method for manufacturing the retardation element of the configuration example shown in FIG. 1 will be described as a specific example of the method for manufacturing the optical element. FIG. 6 is a flowchart showing a method for manufacturing the retardation element.

First, in step S1, a transparent substrate 11 is prepared. Next, in step S2, in order to prevent reflection at the interface between the birefringent layer 13 and the transparent substrate 11, a matching layer 12 is formed by laminating a dielectric film on the transparent substrate 11. Next, in step S3, a first anti-reflection layer 15A (back AR layer) is formed on the opposite surface of the substrate 21 where the matching layer 12 is not formed.

Next, in step S4, the birefringent layer 13 is formed on the matching layer 12 by an oblique deposition method. For example, as shown in FIGS. 3 and 4, after the film is formed by deposition from the first deposition direction 31, the deposition target surface is rotated by 180° around the center of the deposition target surface through which the center line perpendicular to the deposition target surface passes, thereby performing deposition from the second deposition direction 32. By repeating this process, a film is obtained in which the first obliquely deposited film having the first inclined direction and the second obliquely deposited film having the second inclined direction with respect to the normal of the deposition target surface are alternately formed.

Next, in step S5, the birefringent layer 13 is annealed at a temperature of 200° C. or more and 600° C. or less. More preferably, the birefringent layer 13 is annealed at a temperature of 300° C. or more and 500° C. or less, still more preferably at a temperature of 400° C. or more and 500° C. or less. Thus, the characteristics of the birefringent layer 13 can be stabilized.

Next, in step S6, a protective layer 14 is formed on the birefringent layer 13. For example, when $SiO_2$ is formed as the protective layer 14, TEOS (tetraethoxysilane) gas and $O_2$ are preferably used as the materials of $SiO_2$, and a plasma CVD apparatus is preferably used.

Since the $SiO_2$ CVD film forming in the plasma CVD apparatus is characterized by using a vaporized material gas, unlike physical vapor deposition represented by sputtering, TEOS gas can be relatively easily penetrated into the voids between the columnar structures, and adhesion to the birefringent layer 13 can be further improved.

Next, in step S7, a second anti-reflection layer 15B (front AR layer) is formed on the protective layer 14. Finally, in step S8, scribe cutting is performed to a size matching the specifications.

By the above-described manufacturing method, it is possible to obtain a retardation element having excellent tolerance to light of high luminance and high output from a laser light source or the like.

3. Projection Image Display Apparatus

Since the optical element described above has excellent tolerance to high luminance and high output light, it is suitably used for projector applications such as a liquid crystal projector, a DLP (Digital Light Processing: registered trademark) projector, an LCOS (Liquid Crystal On Silicon) projector, and a GLV (Grating Light Valve: registered trademark) projector. That is, the projection image display apparatus according to the present embodiment includes the above-described optical element, an optical modulator, a light source for emitting light, and a projection optical system for projecting modulated light, and the optical modulator and the optical element are disposed in an optical path between the light source and the projection optical system. Examples of the optical modulator include a liquid crystal display device having a transmissive liquid crystal panel, a micromirror display device having a DMD (Digital Micro-mirror Device), a reflective liquid crystal display device having a reflective liquid crystal panel, and a 1-dimensional diffraction type display device having a 1-dimensional diffraction type light modulation element (GLV), among other devices.

In a projection image display apparatus using, for example, a liquid crystal display device, the liquid crystal display device includes at least a liquid crystal panel, a first polarizing plate, and a second polarizing plate, and further includes other members as necessary.

The liquid crystal panel is not particularly limited, and includes, for example, a substrate and a VA mode liquid crystal layer containing liquid crystal molecules having a pretilt with respect to the orthogonal direction of the main surface of the substrate, and modulates an incident light flux. The VA mode (vertical alignment mode) refers to a scheme of moving liquid crystal molecules arranged perpendicular to a substrate (or with a pretilt) by using a vertical electric field.

The first polarizing plate is arranged on the incident side of the liquid crystal panel, and the second polarizing plate is arranged on the outgoing side of the liquid crystal panel. The first polarizing plate and the second polarizing plate are preferably inorganic polarizing plates from the viewpoint of durability.

The retardation element is provided with, for example, an obliquely deposited film containing hafnium oxide as a main component of the configuration example shown in FIG. 1, and is arranged at a required position in an optical path constituting the projection image display apparatus.

In the projection image display apparatus using the micromirror display device, the retardation element is also provided in the same optical path in combination with a diffusion plate and a polarization beam splitter, among others.

The light source is not particularly limited as long as it is a light emitting member, and can be appropriately selected according to the purpose. In the present embodiment, since the liquid crystal display device is provided with an optical element having an obliquely deposited film containing hafnium oxide as a main component, a laser light source that emits light of high luminance and high output can be used.

The projection optical system is not particularly limited as long as it is a member for projecting the modulated light, and can be appropriately selected according to the purpose, and for example, a projection lens for projecting the modulated light onto a screen can be used.

According to the projection image display apparatus having such a configuration, it is possible to display an image of high luminance and high output by using light of high luminance and high output from a laser light source or the like.

EXAMPLE

4. Example

Example of the present technique will be described below. Here, a retardation element having an obliquely deposited film was fabricated, and a laser irradiation test was performed. It should be noted that the present technique is not limited to this example.

Example 1

First, a matching layer was formed by depositing three layers of $SiO_2/Nb_2O_5/SiO_2$ on one surface of a glass substrate (average thickness 0.7 mm) by sputtering.

Next, an anti-reflection layer was formed on the other surface of the glass substrate by alternately laminating eleven layers by sputtering using $Nb_2O_5$ and $SiO_2$.

Subsequently, a deposition source was arranged on the matching layer with $HfO_2$ as a deposition material at a position inclined by 70 degrees with respect to the substrate normal direction, the first deposition direction was set to 0 degrees and the second deposition direction was set to 180 degrees, and oblique deposition was alternately performed. After the deposition, annealing was performed at 450° C. in order to stabilize the characteristics. After annealing, an $SiO_2$ film was formed by plasma CVD using TEOS (tetraethoxysilane) gas and $O_2$ to form a protective layer.

Next, an anti-reflection layer was formed by alternately laminating seven layers by sputtering using $Nb_2O_5$ and $SiO_2$. Scribe cutting was performed to a size matching the specifications, thereby fabricating a retardation element.

Comparative Example 1

A retardation element was fabricated in the same process as in Example 1 except that $Ta_2O_5$ was used as the deposition material.

Laser Irradiation Test

Each of the 30 retardation elements prepared by the method of the Example and Comparative Example was irradiated with laser beams under the following conditions, and the number of damages was counted. As the criteria for damage, cloudiness of the laser-irradiated part of the transparent retardation element was used and this was confirmed visually. Table 1 shows the result of the damage number of the retardation element caused by laser irradiation.

wavelength: 455 nm CW (continuous wave) semiconductor laser.
laser output: 61 W
power density: 10.2 W/mm2
irradiation time: 3 minutes

TABLE 1

|  | Example | Comparative Example |
|---|---|---|
| number of damages/ number of fabrications | 0/30 | 24/30 |

As shown in Table 1, in the comparative example in which the obliquely deposited film was $Ta_2O_5$, more than half of the damages were caused by laser irradiation. On the contrary, in the example in which the obliquely deposited film was $HfO_2$, no damage was caused, and it was found that excellent tolerance was exhibited against high luminance and high output light.

As described above, the following techniques are described in this specification.

[1] An optical element comprising:
   a substrate transparent to light in a used wavelength band; and
   a birefringent layer comprising an obliquely deposited film containing hafnium oxide as a main component.
[2] The optical element according to [1], wherein the birefringent layer is formed by alternately forming a first obliquely deposited film having a first inclined direction and a second obliquely deposited film having a second inclined direction with respect to the normal of the substrate.
[3] The optical element according to [1] or [2], comprising at least one anti-reflection layer formed by laminating two or more kinds of dielectric films having different refractive indices.
[4] The optical element according to one of [1] to [3], further comprising a protective layer formed of a dielectric film on the birefringent layer.
[5] The optical element according to one of [1] to [3], further comprising a matching layer formed by laminating two or more kinds of dielectric films having different refractive indices,
   wherein the substrate, the matching layer, and the birefringent layer are laminated in this order.
[6] The optical element according to [4], wherein the dielectric film of the protective layer is $SiO_2$.
[7] The optical element according to [5], wherein the dielectric film in contact with the birefringent layer of the matching layer is $SiO_2$.
[8] The optical element according to [3], wherein the anti-reflection layer is formed by laminating two or more kinds of dielectric films selected from $TiO_2$, $SiO_2$, $Ta_2O_5$, $Al_2O_3$, $CeO_2$, $ZrO_2$, $ZrO$, $Nb_2O_5$, and $HfO_2$.
[9] The optical element according to any one of [1] to [8], wherein the substrate is one selected from glass, quartz, crystal, and sapphire.

[10] A projection image display apparatus comprising:
an optical element according to one of [1] to [9], an optical modulator, a light source for emitting light, and a projection optical system for projecting a modulated light,
wherein the optical modulator and the optical element are disposed in an optical path between the light source and the projection optical system.

[11] A method for manufacturing the optical element including depositing a deposition material containing hafnium oxide as a main component in a direction inclined with respect to the normal of a deposition target surface to form a birefringent layer comprising an obliquely deposited film.

[12] A method for manufacturing an optical element comprising forming a birefringent layer by repeating a step of depositing a deposition material containing hafnium oxide as a main component in a first direction inclined with respect to the normal of a deposition target surface to form a first obliquely deposited film, and a step of depositing a deposition material containing hafnium oxide as a main component in a second direction inclined with respect to the normal of the deposition target surface to form a second obliquely deposited film.

[13] The method for manufacturing an optical element according to [11] or [12], comprising conducting annealing at a temperature of 200° C. or more and 600° C. or less after forming the birefringent layer.

REFERENCE SIGNS LIST

10 retardation element, 11 transparent substrate, 12 matching layer, 13 birefringent layer, 14 protective layer, 15A, 15B anti-reflection layer, 21 deposition target surface, 31 first deposition direction, 32 second deposition direction, 151 first dielectric film, 152 second dielectric film

The invention claimed is:

1. A method for manufacturing an optical element comprising:
a step of forming a matching layer by laminating two or more kinds of dielectric films having different refractive indices on a substrate that is transparent to light in a used wavelength band;
a step of forming a birefringent layer by repeating a step of depositing a deposition material containing hafnium oxide as a main component in a first direction inclined with respect to the normal of a deposition target surface to form a first obliquely deposited film;
a step of depositing a deposition material containing hafnium oxide as a main component in a second direction inclined with respect to the normal of the deposition target surface to form a second obliquely deposited film on the matching layer;
a step of conducting annealing at a temperature of 300° C. or more and 500° C. or less after forming the birefringent layer; and
a step of forming a protective layer of a dielectric film on the birefringent layer,
wherein the dielectric film in contact with the birefringent layer of the matching layer is $SiO_2$, and
the dielectric film of the protective layer is $SiO_2$.

2. The method for manufacturing an optical element according to claim 1, wherein the thicknesses of the first obliquely deposited film and the second obliquely deposited film are equal to or less than the used wavelength.

* * * * *